(12) United States Patent
Aurand

(10) Patent No.: US 10,486,370 B1
(45) Date of Patent: Nov. 26, 2019

(54) HYBRID SEALING TOOL HAVING MULTIPLE SEAL PATTERNS

(71) Applicant: Sonics & Materials, Inc., Newtown, CT (US)

(72) Inventor: William G. Aurand, Cumming, GA (US)

(73) Assignee: Sonics & Materials, Inc., Newtown, CT (US)

( * ) Notice: Subject to any disclaimer, the term of this patent is extended or adjusted under 35 U.S.C. 154(b) by 0 days.

(21) Appl. No.: 16/200,247

(22) Filed: Nov. 26, 2018

(51) Int. Cl.
 B32B 37/00  (2006.01)
 B29C 65/00  (2006.01)
 B29C 65/08  (2006.01)
 B65B 51/22  (2006.01)

(52) U.S. Cl.
 CPC .......... B29C 66/1122 (2013.01); B29C 65/08 (2013.01); B29C 66/43121 (2013.01); B29C 66/73921 (2013.01); B29C 66/849 (2013.01); B65B 51/225 (2013.01)

(58) Field of Classification Search
 USPC ...................................... 156/580.2
 See application file for complete search history.

(56) References Cited

U.S. PATENT DOCUMENTS

| | | | |
|---|---|---|---|
| 5,067,302 A | 11/1991 | Boeckmann | |
| 5,564,255 A | 10/1996 | Giacomelli | |
| 6,379,483 B1 | 4/2002 | Eriksson | |
| 6,881,287 B2 | 4/2005 | Yasuhira | |
| 8,572,936 B2 * | 11/2013 | Mancin | B29C 65/02 53/548 |
| 8,950,458 B2 | 2/2015 | Patrikios et al. | |
| 9,452,853 B2 * | 9/2016 | Doll | B29C 66/81422 |
| 10,046,874 B2 | 8/2018 | Aurand | |
| 2002/0166617 A1 | 11/2002 | Molander et al. | |
| 2003/0046906 A1 | 3/2003 | Kume et al. | |
| 2003/0217530 A1 | 11/2003 | Tillack et al. | |
| 2007/0017623 A1 | 1/2007 | Wild et al. | |
| 2008/0173694 A1 | 7/2008 | Wild et al. | |
| 2012/0090283 A1 | 4/2012 | Ippers et al. | |
| 2012/0097339 A1 | 4/2012 | Hull | |
| 2014/0033653 A1 | 2/2014 | Cham et al. | |

* cited by examiner

Primary Examiner — James D Sells
(74) Attorney, Agent, or Firm — Forge IP, PLLC

(57) ABSTRACT

A sealing tool includes an anvil and a horn, at least one of which includes a sealing surface having a gusset sealing section and a zipper sealing section, each configured differently than the other. The gusset sealing section includes a plurality of sealing beads including a gusset section barrier sealing bead having a first height and a protective sealing bead having a second height, the second height being smaller than the first height. The zipper sealing section includes a zipper section barrier sealing bead extending and a tapered section adjacent to the zipper section sealing bead, the tapered section tapering from a larger height adjacent to the zipper section sealing bead to a smaller height as a distance away from the zipper section sealing bead increases.

23 Claims, 5 Drawing Sheets

HYBRID SEALING TOOL HAVING MULTIPLE SEAL PATTERNS

FIELD OF THE INVENTION

The present invention relates generally to sealing technology, and more specifically, relates to gusseted and zippered pouches, and systems and methods for making such gusseted and zippered pouches employing ultrasonic and/or heat sealing technology.

BACKGROUND OF THE INVENTION

Gusseted bags have become very popular in the packaging industry. They are used extensively in the packaging of frozen foods as well as for coffee and cereal bags. Gusseted bags allow for expansion and can hold bulkier contents as compared to common pillow bags. However, this type of bag is notoriously difficult to seal. One difficulty lies in sealing across the multiple variations of layers that are unavoidable in creating a gusset.

The ends of a gusseted bag have several areas of folded material which forms the gussets. There may be areas with four layers of material on the outer edges, areas with two layers of material inboard thereof, and another area with four layers of material in the center of the gusset, resulting in a 4-2-4-2-4 layer end. While these folds are important to form the gussets, they create leak points at the transitions between the different areas of thickness.

By comparison, a pillow bag has relative uniformity with only two layers across a majority of the seal. In a pillow bag, a small four layer section resulting from the back fin seal is an insignificant percentage of the total cross seal. Pillow bags can be easily sealed using a variety of sealing technologies.

Heat has traditionally been the preferred technology for gusseted cross seals. While creating a hermetic seal is unreliable with heat, the strength of the seal is good due to its wide width. Typical heat seal jaws produce cross seals that hold approximately 8" Hg to 10" Hg vacuum before leaking on a common coffee pouch.

Custom contour tapered cross seal anvils have been tried with heat, offering an improvement in seal quality. The idea of the contour is to accommodate the 4-2-4-2-4 layer variation of a gusseted bag by incorporating a corresponding height variation into the seal jaws. One company that specializes in this type of sealing tools reports sealing coffee bags with contoured cross seal anvil design produced seals holds an average of 16.1" Hg before leaks occurred. One problem with the contoured/bowed anvil approach, however, is that the taper must be gradual and the location of the gussets and fins drifts from bag to bag in production. Further, there is occasionally a two layer section on the extreme outer edges of the seal that occurs if the gussets do not line up perfectly. Since the tools are contoured away from one another at this point, a leak in this location is almost certain.

The cross sealing of gusseted bags had been attempted with ultrasonics in the past without success. A hermetic seal could be created with ultrasonics using a traditional single seal bead, but it resulted in a fragile bond that was unable to withstand real-world abuse. When the seal experienced flexing or bulging from the internal product or a vacuum burst test, the transition point where four layers meets two layers would become highly stressed and the seal would quickly fail. Quite often, the film would burst at this transition point, tearing through all layers instead of just creating a small leak path. This transition point failure had been an insurmountable hurdle for ultrasonic sealing of gussets.

U.S. Pat. No. 10,046,874, entitled "Sealing System and Method for Gusseted And Zippered Bags" (which is commonly owned with the present application), is directed to a sealing system and method that remedied many of these issues with respect to the cross seals of gusseted and zippered bags of the type described. Specifically, disclosed therein is an ultrasonic sealing tool including an anvil with a sealing surface and a horn with a sealing surface facing the sealing surface of the anvil. The sealing surface of the anvil has a plurality of beads including a first bead having a first height and at least one second bead having a second height, the second height being less than the first height. The ultrasonic sealing tool delivers ultrasonic vibrations via at least one of the anvil and the horn to create a closure seal in a work piece positioned between the anvil and the horn, the closure seal including a first seal created by the first bead and at least one second seal created by the at least one second bead, the first seal having a weld depth greater than a weld depth of the at least one second seal.

In this way, the system and method of U.S. Pat. No. 10,046,874 provides a seal of extreme depth creating a barrier on the outer edge of the bag and one or more additional seals of less depth inboard of the barrier seal to improve package strength and integrity. Since a hermetic seal of relatively low strength can be made with ultrasonics by using extreme compression, the approach of U.S. Pat. No. 10,046,874 is to add a feature or features that improves upon the strength. By adding a secondary and possibly tertiary seal of reduced weld depth, the over-compressed barrier seal can still provide the air-tight properties that are needed while the inboard, reduced depth seals keep the package from bulging and failing at the transition points. These inboard, product-side seals secure the bag and protect the barrier seal from the stress of product or vacuum test. U.S. Pat. No. 10,046,874 is hereby incorporated by reference herein in its entirety.

While the system and method of U.S. Pat. No. 10,046,874 provides greatly improved cross seals, as compared to previously known systems and methods, issues remain with respect to the manufacture of gusseted and zippered bags in some situations.

Referring to FIG. 1, the anatomy of a typical gusseted and zippered bag (10) (also referred to as a standup pouch) is shown. As is known, the bag (10) includes a gusset (12) at the bottom and a top seal (14) along the top edge. Toward the top edge is positioned a zipper (16), with one or more tear notches (18) being positioned between the zipper (16) and the top seal (14) to facilitate removal of the top seal (14) when access to the product is desired. Side seals (20) extend along both side edges of the bag (10) from the gusset (12) to the top seal (14), with there being a transition point (22), toward the gusseted end of the bag (10) transitioning from four layers of film—used to form the gusset (12) and the side seals (20)—to two layers of film—used to form the side seals (20).

The current standard for standup pouches uses premade pouches requiring a middleman (called a converter) that makes the empty pouches on relatively expensive equipment that takes up a significant amount of floor space. The pouches are then shipped to the packer where the product is inserted, and the pouch is sealed on the top thereof using an entirely different (also relatively expensive) machine. The pouches made using this method are generally attractive and have effective seals but are costly due to the extra steps required.

The packaging world has seen a growing trend toward making standup pouches on vertical form fill and seal (VFFS) equipment instead of using the premade pouches. Pouching on VFFS machinery would eliminate the converter (middleman) and the shipping costs associated with it. It would also eliminate the need for large horizontal machines, as VFFS machinery takes up a fraction of the floor space. The problem is that the side seals on pouches made on vertical machines have heretofore been generally unreliable and unattractive. In fact, the industry generally refers to these pouches as "the poor man's standup pouch."

As discussed above, it has been found that the system and method disclosed in U.S. Pat. No. 10,046,874 provides excellent pouch side seals, particularly, along the bottom of the pouch which contains the gusset. However, it has also been found that that same system and method may not provide optimum results on the zipper end (top) of the pouch when used to try to create the side seals. Specifically, the thickness of the zipper may cause a high power draw due to melting excessive plastic on the top of the pouch. Further the system and method disclosed in U.S. Pat. No. 10,046,874 has a tendency to over-crush the zipper and scar the plastic film.

It is therefore desired to address these problems and to provide an improved seal and method of sealing particularly well suited to create the entire length of side seals on gusseted and zippered pouches.

SUMMARY OF THE INVENTION

Accordingly, it is an object of the present invention to provide side seals on gusseted and zippered bags using vertical form fill and seal (VFFS) equipment.

It is a further object of the present invention to provide a bag having side seals that are generally reliable and attractive, that do not cause an excessive power draw due to melting excessive plastic in the vicinity of the zipper and that does not have a tendency to over-crush the zipper and/or scar the plastic film.

These and other objectives are achieved, in accordance with a first aspect of the invention, by providing a sealing tool including an anvil and a horn, at least one of the anvil and the horn having a sealing surface having a gusset sealing section and a zipper sealing section. The gusset sealing section and the zipper sealing section are disposed along a length of the sealing surface, and the gusset sealing section and the zipper sealing section are configured differently than each other. The gusset sealing section includes a plurality of sealing beads including a gusset section barrier sealing bead having a first height and extending along the length of the sealing surface and a gusset section protective sealing bead having a second height and extending along the length of the sealing surface, the second height being smaller than the first height. The zipper sealing section includes a zipper section sealing bead extending along the length of the sealing surface, and a tapered section extending along the length of the sealing surface adjacent to the zipper section sealing bead, the tapered section tapering from a larger height adjacent to the zipper section sealing bead to a smaller height as a distance away from the zipper section sealing bead increases.

In some embodiments, the sealing surface further comprises a knife slot formed therein and extending along the length thereof. This knife slot is disposed between the barrier seal on the outer side of one edge of the pouch from the barrier seal on the outer edge of the next pouch being created. In this embodiment, two side seals are formed simultaneously in the same machine cycle (the right side of pouch #1 and the left side of pouch #2) and then cut between by the knife to separate the pouches as they are completed. In these embodiments, the sealing surface comprises two gusset sealing sections arranged in mirror image on either side of the knife slot and two zipper sealing sections arranged in mirror image on either side of the knife slot.

In some embodiments, the gusset section barrier sealing bead and the zipper section sealing bead comprise a continuous bead spanning both the gusset sealing section and the zipper sealing section. In some embodiments, there is an abrupt transition between the gusset sealing section and the zipper sealing section. A key feature in the proposed innovation is that this transition should be located in the center of the lengths of the sealing tools. By locating the transition in the center point of the tools, large and small pouches can be sealed on the same tools provided the center of the pouch is located in the center of the tools. Regardless of pouch size, the gusset will be sealed on one side of the transition point and the zipper will be sealed on the other. The barrier seal must run continuously along the entire length of the tools without interruption in order to ensure a leak free seal.

In some embodiments, a difference between the first height and the second height is between 0.002 inches and 0.010 inches. In certain of these embodiments, the difference between the first height and the second height is about 0.004 inches. In some embodiments, the distance between peaks of the gusset section barrier sealing bead and the gusset section protective sealing bead is between 0.050 inches and 0.250 inches. In certain of these embodiments, the distance between peaks of the gusset section barrier sealing bead and the gusset section protective sealing bead is about 0.187 inches.

In some embodiments, the sealing surface is formed on the anvil, and the horn has a generally flat surface disposed to mate with the sealing surface. In certain of these embodiments, the horn comprises an ultrasonic horn and the sealing tool further comprises a power supply and a converter connected to the horn converting electrical impulses from the power supply into mechanical vibrations at ultrasonic frequencies.

In some embodiments, the sealing tool is adapted to create a closure seal in a gusseted bag positioned between the anvil and the horn, the closure seal including a barrier seal created by the gusset section barrier sealing bead and a protective seal created by the gusset section protective sealing bead, the barrier seal having a weld depth greater than a weld depth of the protective seal. In certain of these embodiments, the closure seal comprises a plurality of layers of a film, the barrier seal welds all of the plurality of layers and the protective seal does not weld all of the plurality of layers.

In accordance with another aspect of the invention, an ultrasonic sealing tool includes a power supply, an anvil having a sealing surface, a horn having a generally flat surface disposed to mate with the sealing surface, and a converter connected to the horn converting electrical impulses from the power supply into mechanical vibrations at ultrasonic frequencies. The sealing surface has a knife slot formed therein and extending along the length thereof and the sealing surface comprises a gusset sealing section and a zipper sealing section. The gusset sealing section and the zipper sealing section are disposed along a length of the sealing surface, and the gusset sealing section and the zipper sealing section are configured differently than each other. The gusset sealing section comprises a plurality of sealing beads including a gusset section barrier sealing bead having a first height and extending along the length of the sealing surface and a gusset section protective sealing bead having a second height and extending along the length of the sealing surface, the second height being smaller than the first height. The knife slot is disposed between the barrier sealing bead of the first pouch and the barrier sealing bead of the next pouch. The zipper sealing section comprises a zipper section barrier sealing bead extending along the length of the sealing surface, and a tapered section extending along the length of the sealing surface adjacent to the zipper section sealing bead to the center point of the length of the tools, the tapered section tapering from a larger height adjacent to the zipper section sealing bead to a smaller height as a distance away from the zipper section sealing bead increases. The knife slot is disposed between the barrier sealing bead of the first pouch and the barrier sealing bead of the next pouch. The gusset section barrier sealing bead and the zipper section barrier sealing bead comprise a continuous bead spanning both the gusset sealing section and the zipper sealing section.

Other objects of the invention and its particular features and advantages will become more apparent from consideration of the following drawings and accompanying detailed description.

DETAILED DESCRIPTION OF THE INVENTION

Figure 1:
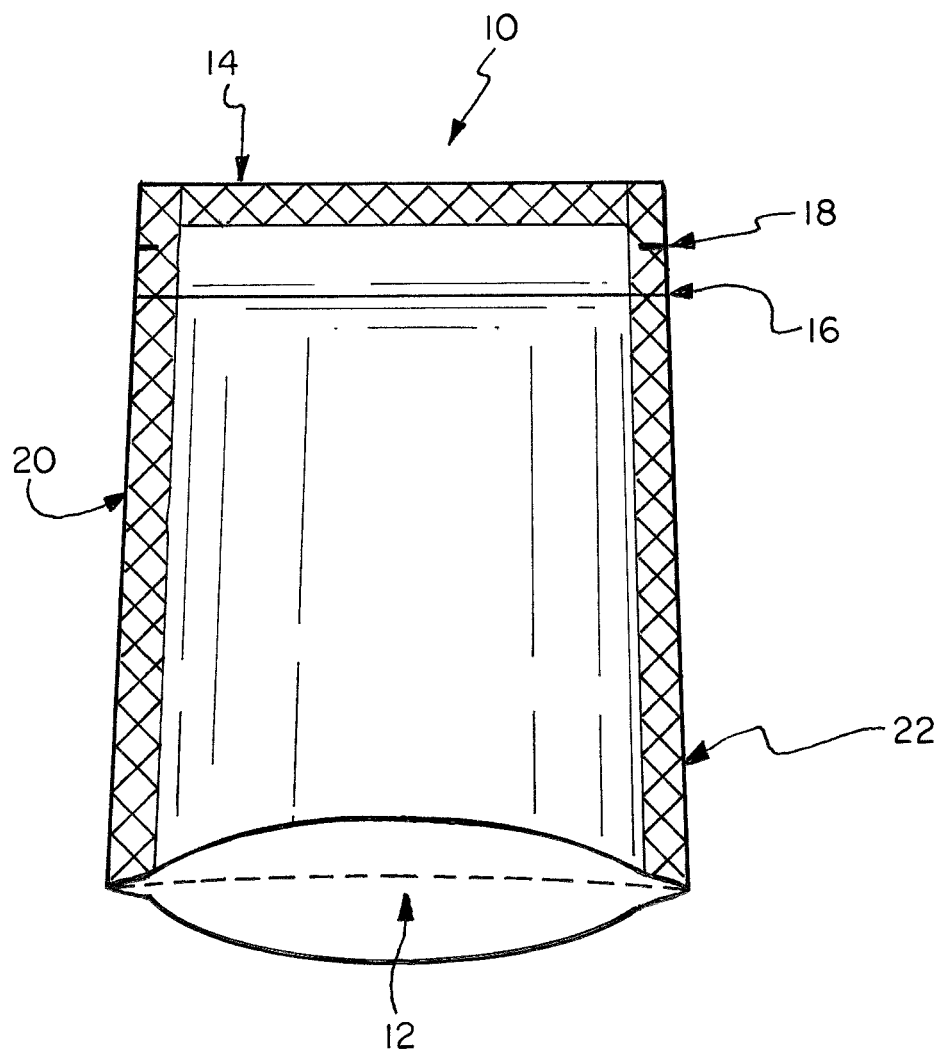
FIG. 1 illustrates the general anatomy of a gusseted and zippered bag, as is known in the prior art.
Figure 2:
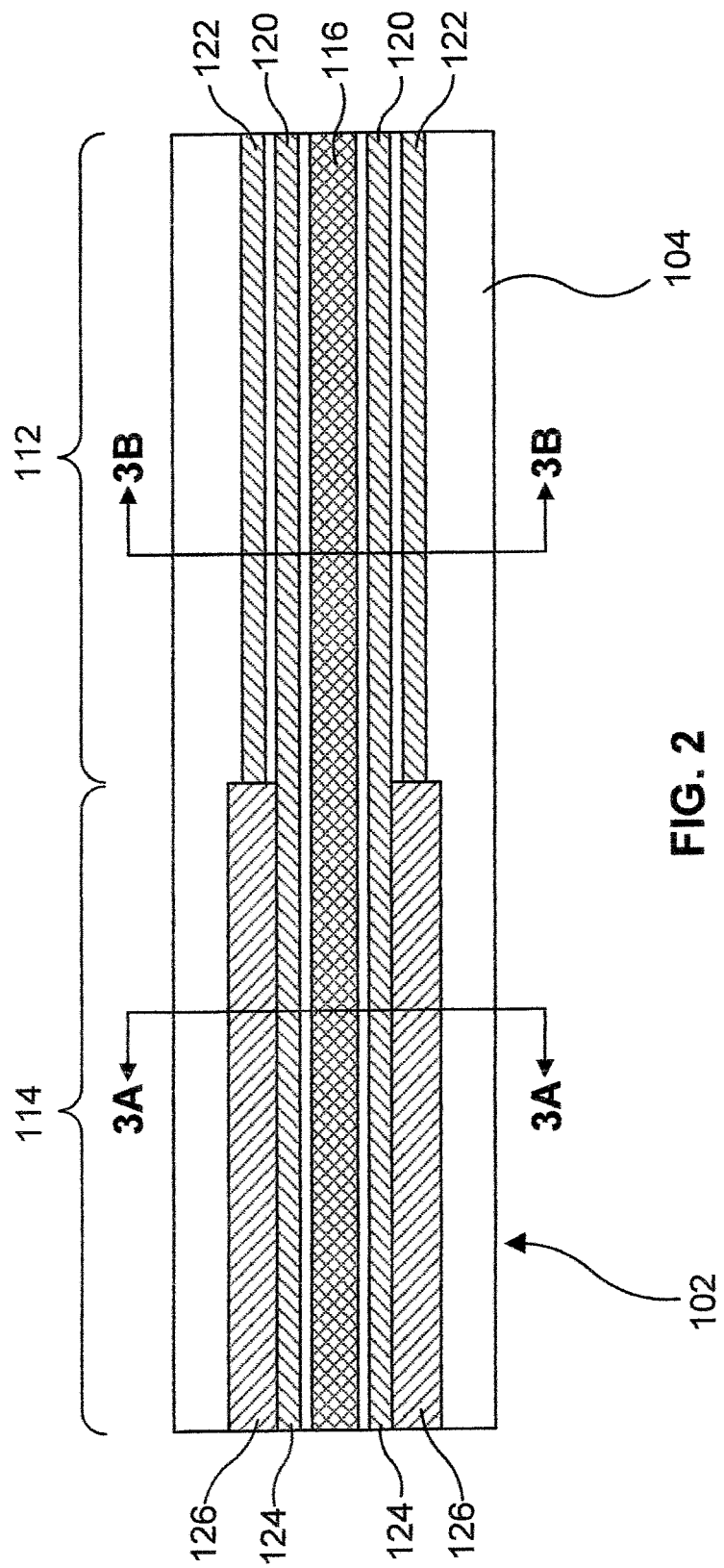
FIG. 2 is a top plan view the anvil side of a sealing tool for a gusseted and zippered bag according to an exemplary embodiment of the present invention.
Figure 3A:
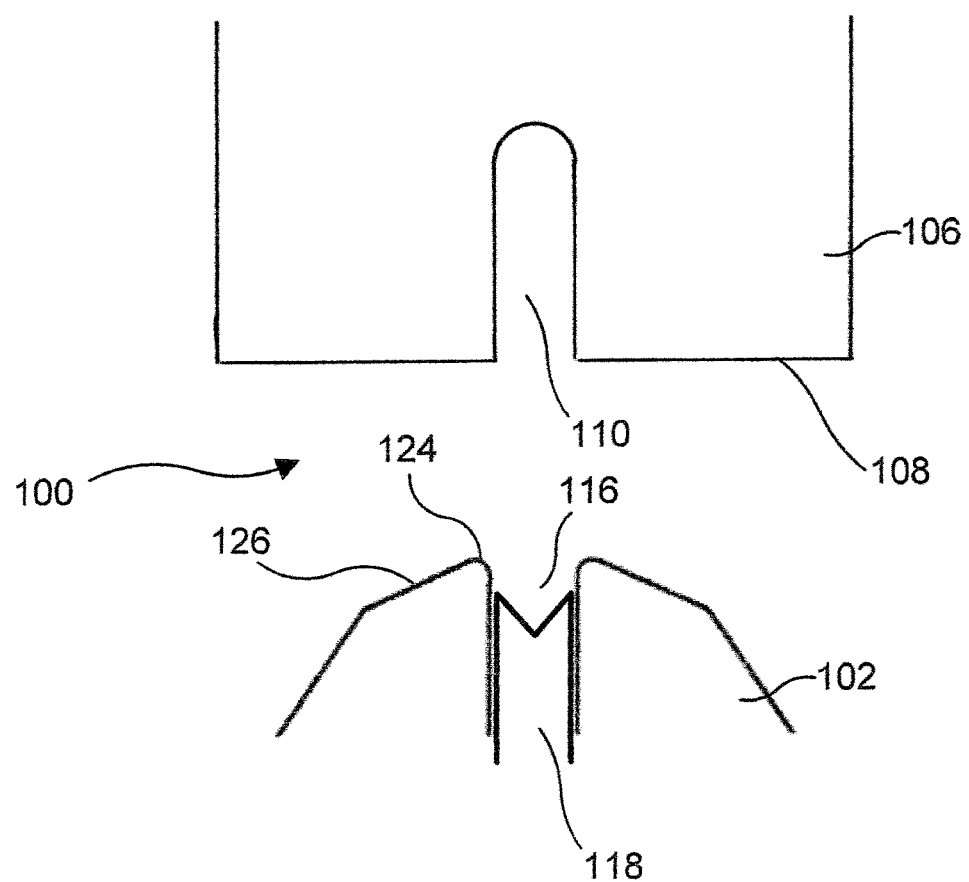
FIG. 3A is a side, partially cross-sectional view of a zipper sealing portion of the sealing tool for a gusseted and zippered bag of FIG. 2, taken along line 3A-3A of FIG. 2.
Figure 3B:
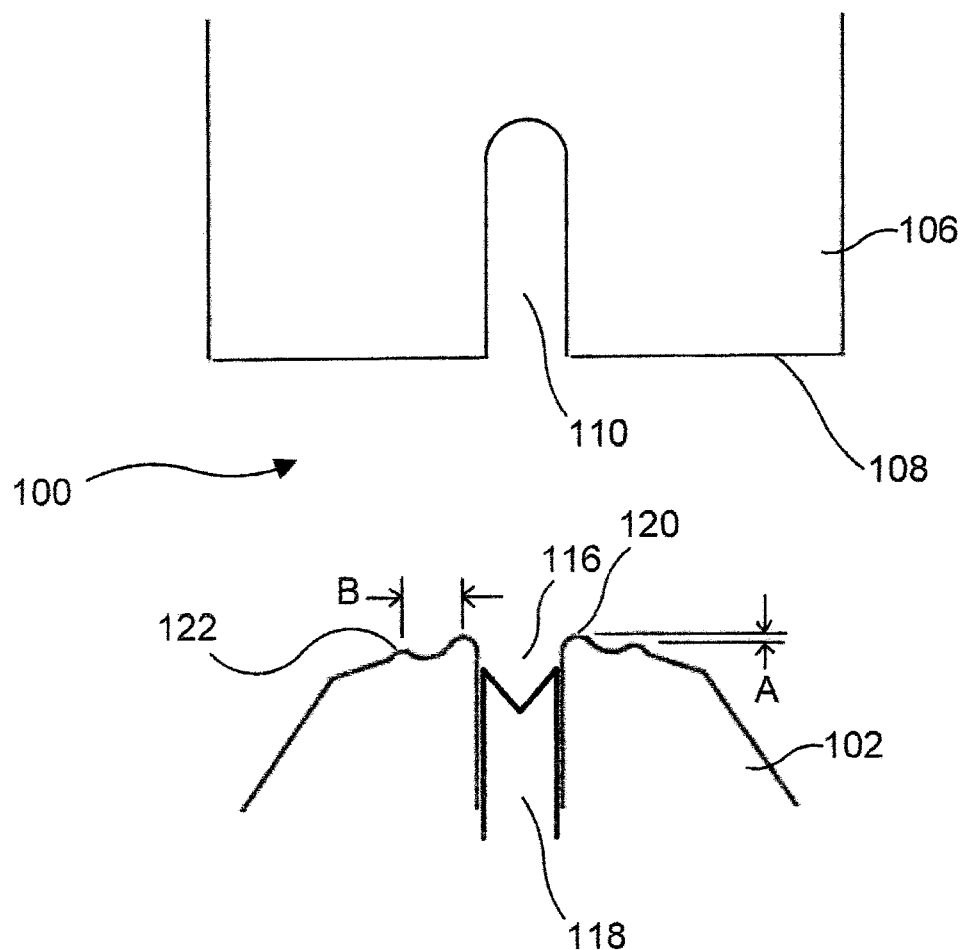
FIG. 3B is a side, partially cross-sectional view of a gusset sealing portion of the sealing tool for a gusseted and zippered bag of FIG. 2, taken along line 3B-3B of FIG. 2.

FIGS. 2-3B illustrate a sealing tool (100) for sealing a work piece, such as the gusseted and zippered bag, according to an exemplary embodiment of the present invention. As is typical, the tool (100) includes a horn or sonotrode and an anvil. As one skilled in the art will understand, the tool (100) is mounted in an ultrasonic welding machine and the horn (or anvil, or both the horn and the anvil) is actuated with high-frequency mechanical vibrations generated by a converter connected thereto that converts electrical impulses from a power supply into the mechanical vibrations at ultrasonic frequencies (e.g., 14 kHz or more). See, for example, U.S. Pat. No. 8,950,458, incorporated herein by reference.

During use, a portion of a work piece to be sealed, such as a bag, is received between opposing surfaces of the horn and the anvil, and the gap between the surfaces is closed or reduced to sandwich the bag by displacing (e.g., manually or automatically) one or both of the horn and anvil. The horn and/or the anvil are then vibrated at ultrasonic frequencies to act upon the bag positioned therebetween and create seals.

At least one of the tool portions (i.e., the horn or the anvil) includes a specially configured sealing surface in order to achieve the desirable sealing characteristics of the present invention. In the exemplary embodiment shown, it is the anvil (102) that has the specially configured sealing surface (104), as discussed in more detail below. In the exemplary embodiment shown, the horn (106) includes a simple flat sealing face (108) with a knife slot (110) at the center thereof. However, in other embodiments, it may be the horn, or both the anvil and the horn, having the specially configured sealing surface.

Referring now specifically to FIG. 2, the sealing surface (104) of the anvil (102) is shown in greater detail. As can be seen, the sealing surface (104) includes at least two sections, a first being a gusset sealing section (112), and a second being a zipper sealing section (114), disposed side-by-side longitudinally. Although the two sections (112, 114) are shown in FIG. 2 as having generally equal lengths, such is not necessarily the case, and one section may be longer than the other. Moreover, although the two sections (112, 114) are shown in FIG. 2 as having an abrupt transition from one to the other, there may instead be a gradual transition, or there may be one or more additional transition sections disposed between the two sections (112, 114).

As is known in the art, the sealing surface (104) of the anvil (102) includes a centrally disposed knife slot (116), which extends along the length of the sealing surface (104) across both the gusset sealing section (112) and the zipper sealing section (114). Also as is known in the art, as the seals are created, or immediately afterwards, a cutting tool or knife (118) is extended from the knife slot (116) of the anvil (102) into the knife slot (110) of the horn (106), thereby severing two adjacent bags being created. As is further know in the art, the sealing surface (104) of the anvil (102) is configured as a mirror image on either side of the knife slot (116), such that the side seals of two adjacent bags being simultaneously sealed are generally identical, but in mirror image.

With reference now specifically to FIGS. 2 and 3B, the gusset sealing section (112) will now be described in more detail. As shown, the gusset sealing section (112) includes, on each side of the knife slot (116), two or more seal beads (120, 122) with different heights. A first bead (120), positioned closest to the knife slot (116) on each side thereof, creates a barrier seal (i.e., an airtight seal) along the outer side edges of the bag by providing the deepest of the weld compressions. A second bead (122), positioned further away from the knife slot (116) than the first bead (120) creates a protective seal using a reduced weld depth. As best seen in FIG. 3B, the height of the first bead (120) is greater than the height of the second seal bead (122).

The optimum offset (A), or the difference in height, between the seal beads (120, 122) may vary depending on such factors as the overall film thickness and seal layer thickness of the bag. However, as an example, it has been found that providing an offset (A) between 0.002 inches and 0.010 inches provides excellent results, with an offset (A) of about 0.004 inches being optimum in certain situations.

The desirable spacing (B) between the peaks of the seal beads (120, 122) may also vary depending on such factors as the overall film thickness and seal layer thickness of, as well as the overall dimensions of, the bag and its contents. However, as an example, it has been found that providing a spacing (B) between 0.050 inches and 0.250 inches provides excellent results, with a spacing (B) of about 0.187 inches being optimum in certain situations.

Figure 4:
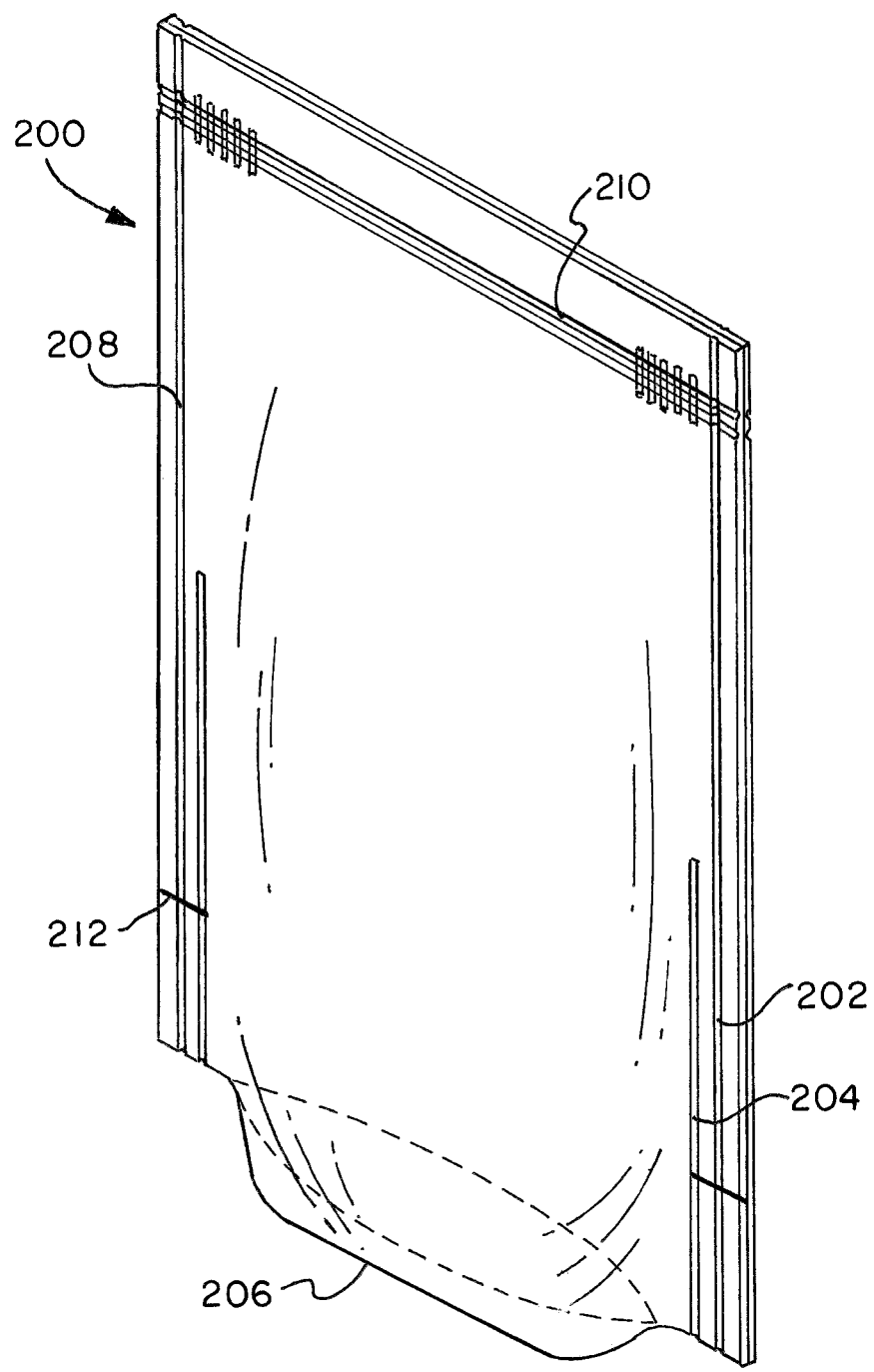
FIG. 4 illustrates the general anatomy of a gusseted and zippered bag, made employing the sealing tool for a gusseted and zippered bag according to FIG. 2.

As shown in FIG. 4, the tool (100) forms a deep barrier seal (202) and at least one shallower protective seal (204), in the vicinity of the lower end of the bag (200)—i.e., the end of the bag (200) containing the gusset (206). The barrier seal (202) is furthest from the internal product, and closest to the side edge of the bag (200). This substantially differs from known sealing methods for creating side seals, which generally involve the creation of one wide seal (which may or may not have a textured configuration) or the creation of multiple seals having equal depth, and consequently equal strength, to serve as backups in case one or more of the seals fails.

Turning now specifically to FIGS. 2 and 3a, the zipper sealing section (114) will now be described in more detail. As shown, the zipper sealing section (114) includes, on each side of the knife slot (116) a seal bead (124) that creates a barrier seal (i.e., an airtight seal) along the outer side edges of the bag. This seal bead (124) simply comprises an extension of the first bead (120) of the gusset sealing section (112), positioned adjacent to the knife slot (116) on each side thereof. As such, the height of, and at least part of the shape of, the seal bead (124) may be similar or identical to that of the first bead (120) of the gusset sealing section (112).

However, instead of the zipper sealing section (114) including a second sealing bead on an interior side of the seal bead, the zipper sealing section (114) includes a tapered portion (126) that tapers from a larger height closest to the knife slot (116) to a smaller height farther from the knife slot (116). As shown, preferably the seal bead (124) smoothly transitions into the tapered portion (126) in order to create enhanced sealing and desirable aesthetics.

The tapered portion (126) is intended to gradually crush the zipper with increasing depth as it approaches the barrier seal, while avoiding the above-discussed issues with conventional techniques. The zipper sealing section (114) thus provides excellent sealing by virtue of the barrier seal bead (124), while at the same time providing the bag with an effective and aesthetically pleasing zipper transition away from the barrier seal. And since the zipper sealing section (114) is configured to be located in areas where there are no gussets, and consequently no areas of transition (212) between two and four layers of sheet material, one or more shallower protective seals, as provided in the gusset sealing section (112), are not required.

Turning again to FIG. 4, the tool (100) forms a deep barrier seal (208), in the vicinity of the upper end of the bag (200)—i.e., the end of the bag (200) containing the zipper (210). In situations, as discussed above, where the seal bead (124) of the zipper sealing section (114) comprises an extension of the first bead (120) of the gusset sealing section (112), the barrier seal (208) may simply comprise an extension of the barrier seal (202). Also as can be seen in FIG. 4, the upper end of the bag (200)—i.e., the end of the bag (200) containing the zipper (210)—does not include a shallower protective seal (204) as does the lower end of the bag (200)—i.e., the end of the bag (200) containing the gusset (206)

The protective seal (204), made on the product side of the barrier seal (202), is not intended to be hermetic or provide a leak free barrier. This inner protective seal (204) exists for the specific purpose of reinforcing the barrier seal (202). Creating multiple barrier seals does not accomplish the same result because the transition points (212) between two and four layers of film closest to the product would still encounter extreme stress that can cause the film to rupture. Thus, with the present invention, the protective seal (204) on the product side does not weld all of the film layers at the transition point (212) to a depth that would create a barrier. This gap in the transition point seal is what dissipates the stress caused when the package bulges.

This inventive tool (100) provides the additional benefit of simultaneously crushing the integral zipper (210). While crushing zippers with ultrasonic tools to enhance hermeticity is a common application, crushing the zipper while simultaneously creating an effective and aesthetically pleasing side seal has been problematic. By providing two separate sections (112, 114), each particularly adapted for its specific purpose, the horn (106) and the anvil (102) act on each side of the pouch (200) to create the effective and aesthetically pleasing side seals and simultaneously crush and seal ends of the zipper.

The present invention is particularly advantageous for use in a vertical mode of operation or vertical machine where both top and bottom seals and/or two side seals are created in a single cycle. This is contrary to horizontal machines in which a single pouch is presented to the welder strictly to close the top. In vertical applications for gusseted bags, the film tube is welded in two distinct areas and then cut between the welds all in a single station. This means that the vertical weld cycle creates the left side seal on one pouch, while simultaneously creating the right side seal of the next pouch. This technology may however be used in horizontal machinery to enhance the seal performance of gusset side seals on standup pouches.

The tool (100) of the present invention may be used in connection with an ultrasonic sealing machine. The machine may include, for example, the tool (100) of the present invention that provides mechanical vibrations to form an ultrasonic side seal along a length of each of the bags and also a second ultrasonic tool to form the top and bottom ultrasonic seals on the bags (which may, for example, comprise the tool disclosed in U.S. Pat. No. 10,046,874, although such is not strictly necessary). At least one of the horn assembly (106) and/or the anvil assembly (102) of the tool (100) may include a converter connected thereto that converts electrical impulses from a power supply into mechanical vibrations at ultrasonic frequencies (e.g., 14 kHz or more). In some cases, the vibrations may be provided to the horn and/or anvil via a booster.

Alternately, the tool (100) of the present invention may be used in connection with a heat sealing machine, as may be known in the art, without departing from the spirit of the invention.

Although the invention has been described with reference to a particular arrangement of parts, features and the like, these are not intended to exhaust all possible arrangements or features, and indeed many modifications and variations will be ascertainable to those of skill in the art.

What is claimed is:

1. A sealing tool, comprising:
    an anvil and a horn, at least one of the anvil and the horn having a sealing surface comprising a gusset sealing section and a zipper sealing section, said gusset sealing section and said zipper sealing section being disposed along a length of said sealing surface, and wherein said gusset sealing section and said zipper sealing section are configured differently than each other;
    said gusset sealing section comprising a plurality of sealing beads including a gusset section barrier sealing bead having a first height and extending along the length of the sealing surface and a gusset section protective sealing bead having a second height and extending along the length of the sealing surface, the second height being smaller than the first height; and
    said zipper sealing section comprising a zipper section sealing bead extending along the length of the sealing surface, and a tapered section extending along the length of the sealing surface adjacent to the zipper section sealing bead, the tapered section tapering from a larger height adjacent to the zipper section sealing bead to a smaller height as a distance away from the zipper section sealing bead increases.

2. The sealing tool of claim 1 wherein said sealing surface further comprises a knife slot formed therein and extending along the length thereof.

3. The sealing tool of claim 2 wherein the gusset section barrier sealing bead is disposed between the knife slot and the gusset section protective sealing bead, and wherein the zipper section sealing bead is disposed between the knife slot and the tapered section.

4. The sealing tool of claim 3 wherein said sealing surface comprises two gusset sealing sections arranged in mirror image on either side of said knife slot and two zipper sealing sections arranged in mirror image on either side of said knife slot.

5. The sealing tool of claim 1 wherein the gusset section barrier sealing bead and the zipper section sealing bead comprise a continuous bead spanning both said gusset sealing section and said zipper sealing section.

6. The sealing tool of claim 1 wherein there is an abrupt transition between said gusset sealing section and said zipper sealing section.

7. The sealing tool of claim 1 wherein a difference between the first height and the second height is between 0.002 inches and 0.010 inches.

8. The sealing tool of claim 7 wherein the difference between the first height and the second height is about 0.004 inches.

9. The sealing tool of claim 1 wherein a distance between peaks of the gusset section barrier sealing bead and the gusset section protective sealing bead is between 0.050 inches and 0.250 inches.

10. The sealing tool of claim 9 wherein the distance between peaks of the gusset section barrier sealing bead and the gusset section protective sealing bead is about 0.187 inches.

11. The sealing tool of claim 1 wherein said sealing surface is formed on said anvil, and wherein said horn has a generally flat surface disposed to mate with said sealing surface.

12. The sealing tool of claim 11 wherein said horn comprises an ultrasonic horn and wherein said sealing tool further comprises:
a power supply; and
a converter connected to said horn converting electrical impulses from said power supply into mechanical vibrations at frequencies above 14 kHz.

13. The sealing tool of claim 1 said sealing tool is adapted to create a closure seal in a gusseted bag positioned between said anvil and said horn, the closure seal including a barrier seal created by said gusset section barrier sealing bead and a protective seal created by said gusset section protective sealing bead, the barrier seal having a weld depth greater than a weld depth of the protective seal.

14. The sealing tool according to claim 13, wherein the closure seal comprises a plurality of layers of a film, wherein the barrier seal welds all of the plurality of layers and the protective seal does not weld all of the plurality of layers.

15. An ultrasonic sealing tool, comprising:
a power supply;
an anvil having a sealing surface;
a horn having a generally flat surface disposed to mate with said sealing surface;
a converter connected to said horn converting electrical impulses from said power supply into mechanical vibrations at ultrasonic frequencies;
said sealing surface having a knife slot formed therein and extending along the length thereof and comprising a gusset sealing section and a zipper sealing section, said gusset sealing section and said zipper sealing section being disposed along a length of said sealing surface, and wherein said gusset sealing section and said zipper sealing section are configured differently than each other;
said gusset sealing section comprising a plurality of sealing beads including a gusset section barrier sealing bead having a first height and extending along the length of the sealing surface and a gusset section protective sealing bead having a second height and extending along the length of the sealing surface, the second height being smaller than the first height, and wherein the gusset section barrier sealing bead is disposed between the knife slot and the gusset section protective sealing bead;
said zipper sealing section comprising a zipper section sealing bead extending along the length of the sealing surface, and a tapered section extending along the length of the sealing surface adjacent to the zipper section sealing bead, the tapered section tapering from a larger height adjacent to the zipper section sealing bead to a smaller height as a distance away from the zipper section sealing bead increases, and wherein the zipper section sealing bead is disposed between the knife slot and the tapered section; and
wherein the gusset section barrier sealing bead and the zipper section sealing bead comprise a continuous bead spanning both said gusset sealing section and said zipper sealing section.

16. The sealing tool of claim 15 wherein said sealing surface comprises two gusset sealing sections arranged in mirror image on either side of said knife slot and two zipper sealing sections arranged in mirror image on either side of said knife slot.

17. The sealing tool of claim 15 wherein there is an abrupt transition between said gusset sealing section and said zipper sealing section.

18. The sealing tool of claim 15 wherein a difference between the first height and the second height is between 0.002 inches and 0.010 inches.

19. The sealing tool of claim 18 wherein the difference between the first height and the second height is about 0.004 inches.

20. The sealing tool of claim 15 wherein a distance between peaks of the gusset section barrier sealing bead and the gusset section protective sealing bead is between 0.050 inches and 0.250 inches.

21. The sealing tool of claim 20 wherein the distance between peaks of the gusset section barrier sealing bead and the gusset section protective sealing bead is about 0.187 inches.

22. The sealing tool of claim 15 said sealing tool is adapted to create a closure seal in a gusseted bag positioned between said anvil and said horn, the closure seal including a barrier seal created by said gusset section barrier sealing bead and a protective seal created by said gusset section protective sealing bead, the barrier seal having a weld depth greater than a weld depth of the protective seal.

23. The sealing tool according to claim 22, wherein the closure seal comprises a plurality of layers of a film, wherein the barrier seal welds all of the plurality of layers and the protective seal does not weld all of the plurality of layers.

* * * * *